United States Patent
Fisher et al.

(10) Patent No.: US 7,139,726 B2
(45) Date of Patent: Nov. 21, 2006

(54) METHOD AND SYSTEM FOR SUPPLYING AUTOMATIC STATUS UPDATES USING ELECTRONIC MAIL

(75) Inventors: Alan S. Fisher, Fremont, CA (US); Samuel Jerrold Kaplan, Hillsborough, CA (US)

(73) Assignee: eBay Inc., San Jose, CA (US)

( * ) Notice: Subject to any disclaimer, the term of this patent is extended or adjusted under 35 U.S.C. 154(b) by 180 days.

(21) Appl. No.: 09/426,573

(22) Filed: Oct. 25, 1999

(65) Prior Publication Data

US 2003/0088473 A1   May 8, 2003

Related U.S. Application Data

(63) Continuation of application No. 08/725,635, filed on Oct. 8, 1996, now Pat. No. 6,047,264, which is a continuation of application No. 08/695,095, filed on Aug. 8, 1996, now abandoned.

(51) Int. Cl.
*G06F 17/60* (2006.01)

(52) U.S. Cl. .................... 705/26; 705/8; 705/9; 705/11

(58) Field of Classification Search .................... 705/8, 705/9, 11, 26
See application file for complete search history.

(56) References Cited

U.S. PATENT DOCUMENTS

| | | | |
|---|---|---|---|
| 4,554,418 A | | 11/1985 | Toy |
| 4,766,542 A | | 8/1988 | Pilarczyk |
| 4,799,156 A | * | 1/1989 | Shavit et al. .................. 705/26 |
| 4,975,841 A | | 12/1990 | Kehnemuyi et al. |
| 5,235,680 A | | 8/1993 | Bijnagte |
| 5,265,006 A | * | 11/1993 | Asthana et al. ................. 705/8 |
| 5,283,731 A | | 2/1994 | Lalonde et al. |
| 5,313,051 A | * | 5/1994 | Brigida et al. ............... 235/375 |
| 5,317,683 A | | 5/1994 | Hager et al. |
| 5,418,528 A | | 5/1995 | Hosack et al. |
| 5,428,778 A | | 6/1995 | Brookes |
| 5,485,369 A | * | 1/1996 | Nicholls et al. ................ 705/9 |
| 5,487,100 A | | 1/1996 | Kane |
| 5,508,817 A | | 4/1996 | Kunigami |
| 5,548,753 A | | 8/1996 | Linstead et al. |
| 5,627,764 A | | 5/1997 | Schutzman et al. |
| 5,630,073 A | * | 5/1997 | Nolan ......................... 705/45 |
| 5,664,115 A | | 9/1997 | Fraser |
| 5,694,546 A | | 12/1997 | Reisman |
| 5,710,887 A | | 1/1998 | Chelliah et al. |

(Continued)

FOREIGN PATENT DOCUMENTS

CA   2156907   9/1994

(Continued)

OTHER PUBLICATIONS

PR Newswire article, FEDEX Ship Delivers Shipping to the Desktop, Nov. 1994.*

(Continued)

*Primary Examiner*—Jagdish Patel
(74) *Attorney, Agent, or Firm*—Schwegman, Lundberg, Woessner & Kluth, P.A.

(57) ABSTRACT

A system is disclosed for automatically updating the status of customers' orders and shipments via electronic mail without using a human attendant to create and send the electronic mail messages. Preferably implemented in software, the updating system allows a large set of customers to be periodically updated over a computer or communications network via electronic mail. The system includes a database for maintaining order and shipping status and other relevant information.

11 Claims, 5 Drawing Sheets

U.S. PATENT DOCUMENTS

| | | | |
|---|---|---|---|
| 5,715,314 A | | 2/1998 | Payne et al. |
| 5,797,133 A | * | 8/1998 | Jones et al. .................... 705/38 |
| 5,960,408 A | * | 9/1999 | Martin et al. ................. 705/11 |
| 6,047,264 A | | 4/2000 | Fisher et al. |
| 6,151,582 A | * | 11/2000 | Huang et al. .................. 705/8 |
| 6,285,916 B1 | | 9/2001 | Kadaba et al. |

FOREIGN PATENT DOCUMENTS

CA  2173166 A1  12/1996

OTHER PUBLICATIONS

News release article "Beyond-Search: New System for Online Product Catalobs..", May 1996.*

E-commerce: Computer Associated announces CA-Openingres/ICE, providing Web enabled access to corporate data, EDGE on & about AT&T, v10, n386, p19(1) published Dec. 11,1 995.*

Robinson, Brian, "Windows-based EC front end debuts, (MACA's Electronic Procurement System 4.0)" (Abstract) Federal Computer Week, vol. 8, No. 31, Oct. 24, 1994, p 32.

Kennedy, Randall C., "Automatic delivery for interoffice forms; JetForm for E-Mail 3.10" (Abstract), Windows Source vol. 1, No. 7, Aug. 1993, p. 154.

Bob Holmes et al., "The development of paperless trading in shipping", Online Publications, Electronic Data Interchange conference, London, Apr. 1987, pp 45-54.

Judith E. Payne et al., "Electronic Data Interchange (EDI) Using Electronic Commerce to Enhance Defense Logistics", R-4030-P &L, Rand, 1991, pp. 42-54.

Kannan Srinivasan et al., "Impact of Electronic Data Interchange Technology on JIT Shipments", Management Science, vol. 40, No. 10, Oct. 1994, pp. 1291-1304.

P. Stecher, "Building business and application systems with the Retain Application Architecture", IBM Systems Journal, vol. 32, No. 2, 1993, pp. 278-306.

A. Roger Kaye et al., "A User Agent For Multiple Computer-Based Message Services" Computer-Based Message Services, Elsevier Science Publishers B.V., 1984, pp. 127-136.

Eric Gold, "Envoys in Electronic Mail Systems", Association for Computing Machinery 516015, Summer 1986, pp. 2-10.

H. Fanderl et al., "The Open Document Architecture: From standardization to the market", IBM Systems Journal, vol. 31, No. 4, 1992, pp. 728-753.

R.E. Moore, "Utilizing the SNA Alert in the management of multivendor networks", IBM Systems Journal, vol. 27, No. 1, 1988, pp. 15-30.

W. Bruce Croft et al., "Task Support In an Office System", ACM Transactions on Office Information Systems, vol. 2, No. 3, Jul. 1984, pp. 197-212.

Maxine L. Rockoff et al., "Distributed Brokerage Offices Through Information Technology", ACM Conference on Organizational Computing Systems, 1991, pp. 165-170.

Ken Steel, "The Standardisation of Flexible EDI Messages", Chapter 3, Electronic Commerce, Current Research Issues and Applications, 24th Nov., 1994, pp. 13-26.

Paul Wilson, "Structures for Mailbox System Applications", Computer-Based Message Services, Elsevier Science Publishers B.V., 1984, pp. 149-165.

April Jacobs, "Oil Change gives automatic software tune-ups", Computerworld May 27, 1996, p. 29.

Kim S. Nash et al., "Vendors deliver IS-specific apps over the 'net'", computerworld, May 6, 1996, p. 16.

John Cox Middleware product to manage transactions over the network, Network World, Feb. 26, 1996, pp. 29-30.

Eric R. Chabrow, "Data Is Part Of The Packge", IW, Dec. 25, 1995, pp 43-44.

Lenny Rhine et al., "Journal Claiming via Electronic Mail", Computers In Libraries, Jun. 1989, p. 34.

Nagesh Kadaba et al., "Multi-Stage Parcel Tracking System" (Abstract), WO 96/13015, PCT Gazette—Section I, No. 20/T996, p. 7860.

Toshio Kunigami et al., "Electronic Mail Accounting System" USPN 5,508,817, Official Gazette of the U.S. Patent and Trademark Office, Apr. 16, 1996, p. 2139.

Towle, Henry, "On the Fast Track with TotalTrack: UPS Deploys Mobile Data Service," Document Delivery World, vol. 9, No. 9, Apr./May 1993, pp. 30-31.

Boyd, Wallace, "Kodak Expands Businessland Outsourcing Pact," Computer Reseller News, No. 399, Dec. 17, 1990, p. 88.

"Internet Watch: Advertising on the Internet Must be Useful or Entertaining if it is to Win Over Its Audience," Marketing Week, vol. 18, No. 48, Mar. 1, 1996, p. 16.

Oberdorf, Shannon, "Online Transactions Come Full Circle," Catalog Age, vol. 13, No. 13, Dec. 1996, p. 10.

"Dell Launches Internet Computer Store," PR Newswire, Jul. 22, 1996 (3 pages).

"INTERSOLV's PVCS Tracker Helps Corporate UK Achieve More From Its Web Sites," M2 PressWIRE Archives, Aug. 28, 1996 (3 pages).

Mc Kie, Stewart, "Internet—DBMS Strategies," DBMS Tools & Strategies for IS Professionals, vol. 9, No. 11, Oct. 1996, pp. 44-46, 50 and 52 (and index).

Saeki, Motoshi et al., "Supporting Distributed Individual Work in Cooperative Specification Development," Department of Computer Science, Tokyo Institute of Technology, Nov. 15, 1995, pp. 232-247.

Barriot, E., "From Standalone Voice Processing Applications to Call Center Solutions", Alcatel Telecommunications Review, 1995, pp. 52-57.

Lamotte, J., "Getting the Most Out Of Mail-enabled Applications", Managing Office Technology, vol. 39, No. 4, Mar. 1994, p. 73.

Helinski, Paul , "Automating Web-Site Maintenance", *Part 2, Perl-based tools to manage your Web site, Web Techniques, Issn 1086-556XP002048313*. (Dec. 1996), pp 75-76, 78.

Search Report, "International Searching Authority", *PCT/US 97/13567*, (Jul. 31, 1997).

Underwood, Chris, "A Multiple Round Ascending Auction Process Suitable for the Disposal of Radio Spectrum in New Zealand", (Jan. 17, 1996).

* cited by examiner

METHOD AND SYSTEM FOR SUPPLYING AUTOMATIC STATUS UPDATES USING ELECTRONIC MAIL

CROSS-REFERENCE TO RELATED APPLICATIONS

This application is a continuation of U.S. patent application Ser. No. 08/725,635, filed Oct. 8, 1996 now U.S. Pat. No. 6,047,264, which is a continuation of U.S. patent application Ser. No. 08/695,095 filed Aug. 8, 1996 now abandoned, both of which are incorporated herein by reference.

BACKGROUND OF THE INVENTION

1. Field of the Invention

The present invention relates generally to electronic commerce and more particularly to updating customers as to the status of their orders and order shipments.

2. Description of the Related Art

In the mail order industry, it is common practice to notify customers by mail when their orders are backlogged or their shipments will be delayed for some reason. The advent of wide area electronic networks like the Internet has made it possible for customers to query the status of their orders and shipments by directly accessing the merchants' and shippers' information systems. For example, both Federal Express® (FedEx®) and United Parcel Service (UPS®) have world wide web sites on the Internet where customers can track the shipping status of their packages by simply inputting the package's tracking number to a computer form on a web page.

There is an advantage however, to notifying customers by mail when their shipments will be delayed, because the customer is not required to take any action to receive this notification—that is, the customer does not have to proactively access the Internet or other network, go to the shipper's world wide web site, and obtain and input a parcel tracking number in order to check on the shipping status.

In U.S. Pat. No. 5,428,778 to Brookes, a keyword based profile is used to match information coming into a system with the users' interests. In Brookes, the user is alerted to the presence of the information in the database (perhaps because there is a delivery fee associated with the information), but the information is not actually delivered to the user.

Also in the related art are several Internet-based electronic mail systems that deliver information to users daily via E-mail based on personal profiles. There are, for example, several stock quotation services that electronically mail a list of a user's personal favorite stock prices each day. Unlike Brookes, such systems do deliver the information directly to the user. However, the user is required to submit an interest profile to the system in order to receive feedback.

There is a need in the art, therefore, for a system and method for automatically notifying a party of the status of a delivery without requiring submission of a status request or special profile information from the party.

SUMMARY OF THE INVENTION

The present invention overcomes the disadvantages of the background art by providing a method and system for automatically providing customers with their order status via electronic mail over a computer network without the aid of a human customer service representative and without the need for user profile information.

To address the shortcomings of the background art, the present invention provides, in a computer network enabling communication between a plurality of computers, a method and system for processing and transmitting update information, implemented as a program on a first computer within said network, the system comprising record creation means for creating a record in response to an order submitted to the first computer by a first party, status information retrieval means for retrieving status information relevant to the order, record update means for updating the record in response to the retrieved status information, message generation means for generating an electronic mail status message reflective of the updated record, and message transmission means for transmitting the electronic mail status message to the first party across the network.

For example, when a customer places an order with a merchant, the customer provides the merchant with an electronic mail address. Then, the merchant ships the order via a common carrier such as FedEx, UPS or the postal service. The system of the present invention periodically interrogates the carrier's information system via a computer network to check the transit status of the order. When the transit status, location, or other relevant information changes, the system automatically composes and transmits an electronic mail message to the customer, informing the customer of the status of the shipment. The system may send messages notifying the customer of such common events as (1) when the order is initially sent to the shipper, (2) when the shipment leaves the shipper's distribution center, (3) the current or approximate physical location of the shipment once the shipment is in transit (e.g., headed westbound on Interstate 70 between St. Louis and Kansas City), (4) when the shipment reaches a distribution terminal for transfer to another truck or form of carriage, and (5) when the shipment is received at the customer's location. Notifying business customers that the shipment has been received at a site is especially important because it often takes one to two days for a company's internal mail system to deliver a package to the customer's desk once it has been received at the site's receiving dock, front office or mail room.

The invention further provides, in a computer network enabling communication between a plurality of computers, an update processing and transmission system, the system comprising: record creation means, for creating a record in response to a commerce-related event, status information retrieval means for retrieving status information about said commerce-related event, message generation means for generating a status message reflective of said status information, and message forwarding means for forwarding said status message to a point where it may be accessed by an interested party. The status information may relate to shipment of an item specified within said record. Also, the status information retrieved by said status information retrieval means may be contained on a second computer physically remote from a first computer on which said record is stored and accessible via said network. Furthermore, the record may be stored on a record database within a first computer. Moreover, the system may further comprise a status database for separately storing status information about the record. Finally, the invention further comprises a method for accomplishing the above-listed functions.

The primary advantage of this system is that it results in higher customer loyalty because customers are kept well informed of the status of their orders or shipments without taking any additional action beyond providing an electronic mail address to the merchant or shipper. Moreover, since the cost of electronic mail transmissions is extremely low, the system and method lower costs for merchants or shippers to provide status information to their customers.

BRIEF DESCRIPTION OF THE DRAWINGS

The aforementioned advantages of the invention, as well as additional advantages thereof, will be more fully understood as a result of a detailed description of the preferred embodiment when taken in conjunction with the accompanying drawings in which.

DETAILED DESCRIPTION OF A PREFERRED EMBODIMENT

Figure 1:
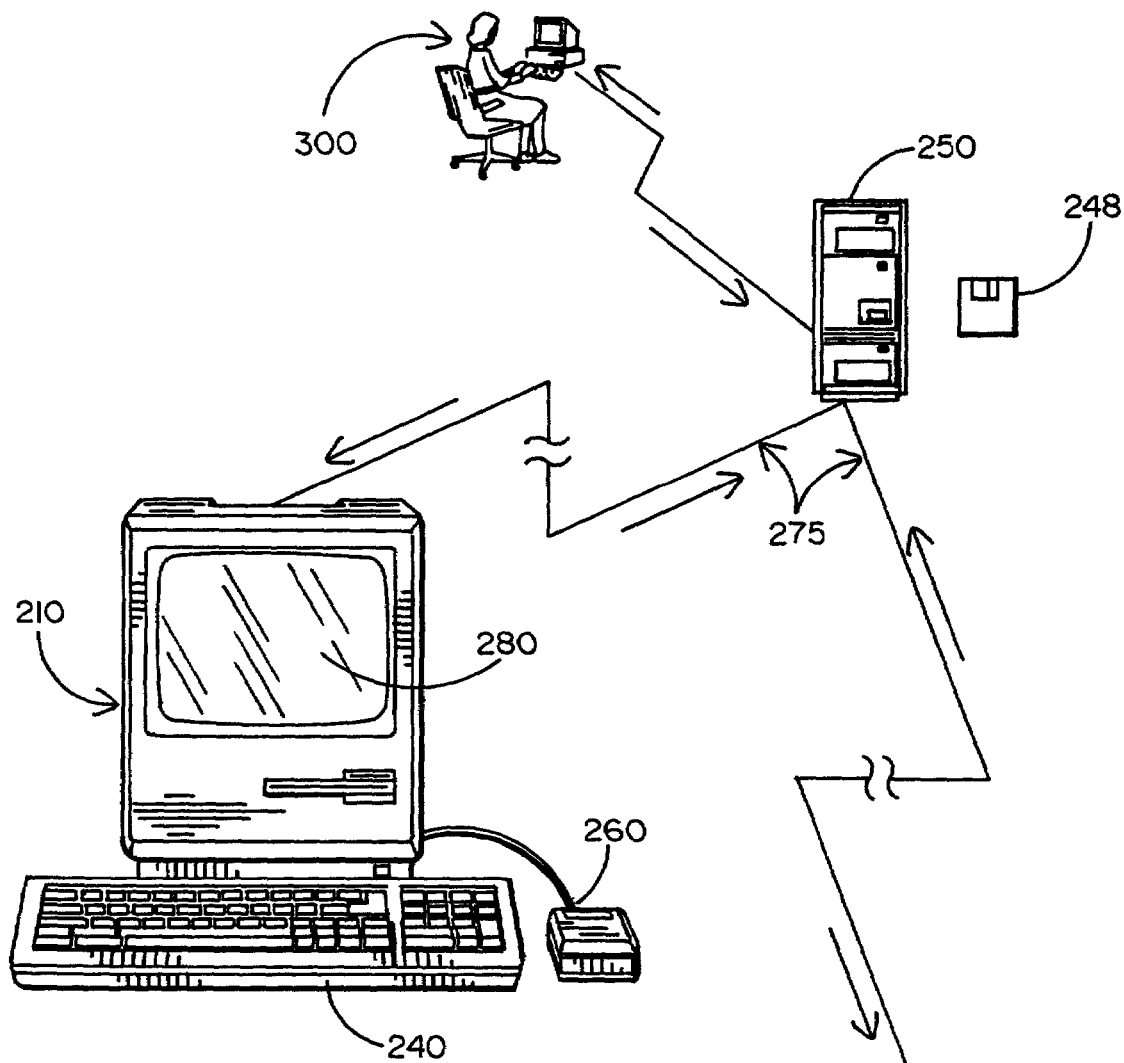
FIG. 1 illustrates a preferred computer environment for implementing the system and method of the present invention.
Figure 1:
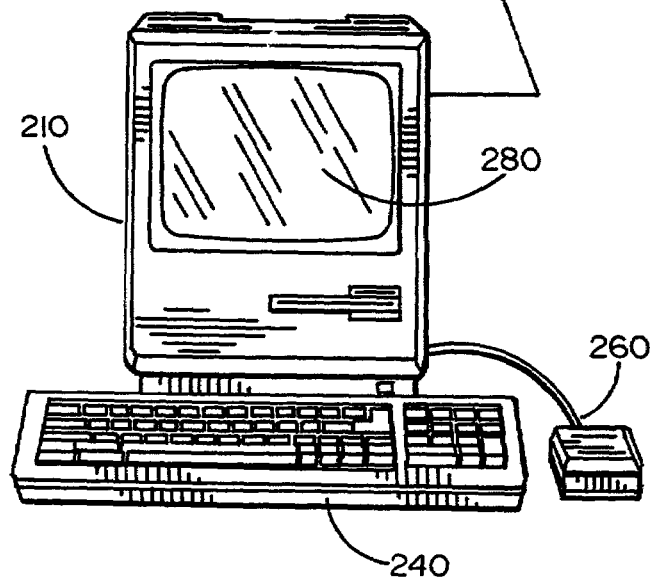

The present invention is preferably implemented as a computer program 248 running on a central server host computer shown in FIG. 1, attached to a wide area network 275 accessible by many potential customers through remote terminals 210 using keyboard 240, pointing device 260 and monitor 280. A preferred network for implementing the present invention is the Internet which is accessible by a significant percentage of the world population, although the network may also be a local area or limited area accessible network.

Figure 2:
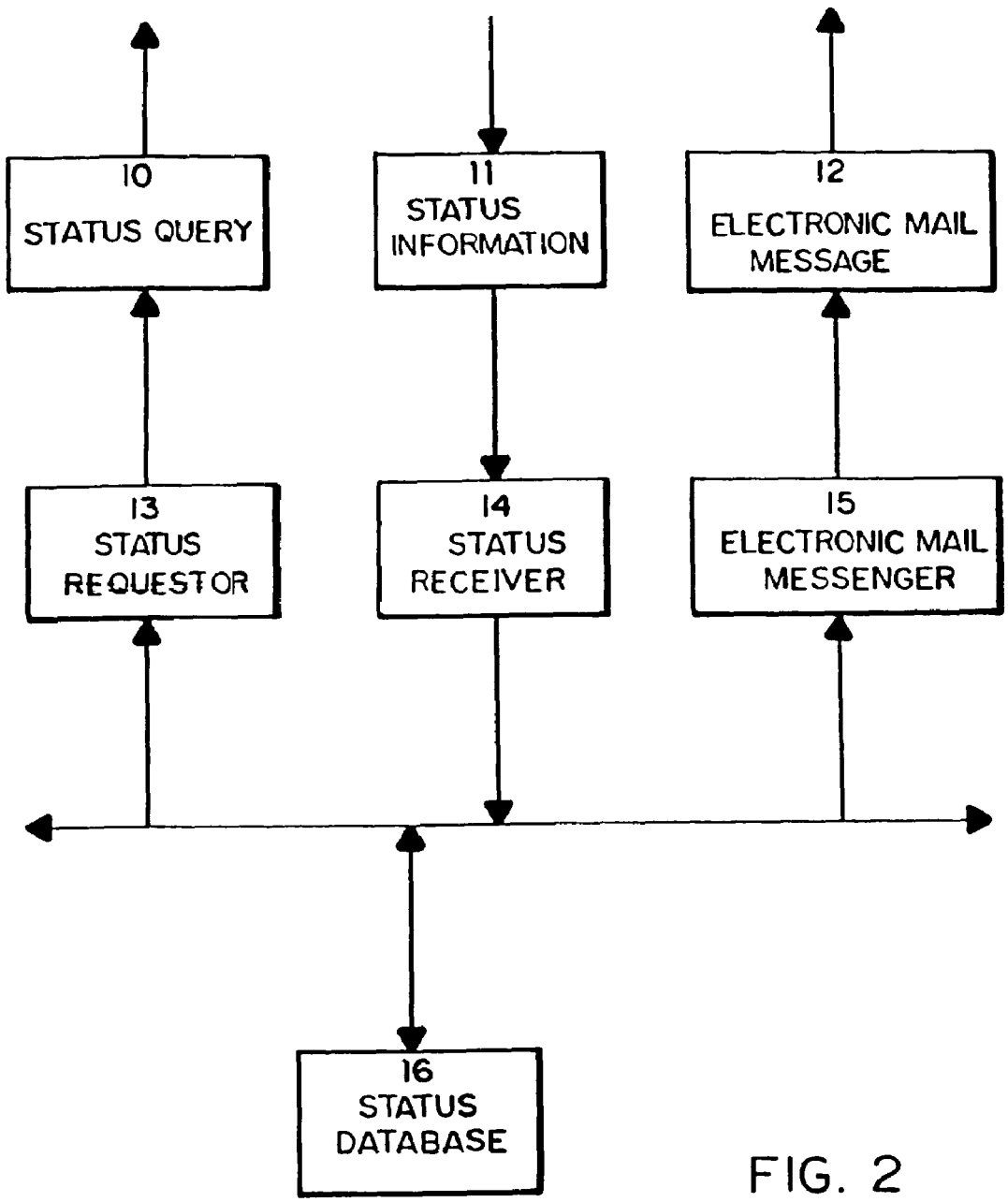
FIG. 2 is block diagram of components illustrating a preferred embodiment of the present invention.

Information about the customers and their respective orders is maintained in a status database 16 such as the one shown in FIG. 2. Status database 16 may be maintained on server 250 shown in FIG. 1. Individual customer orders may be placed in this database either by order entry personnel 300 or electronically by order entry systems also attached to wide area network 275 of FIG. 1. Status information in status database 16 may be updated manually by order entry personnel or electronically by other means such as status receiver 14 shown in FIG. 2.

Periodically via status query 10, status requester 13, sends a status request to another host computer on wide area network 275, such as a common carrier shipping service like UPS or FedEx. Status information 11 is returned and received by status receiver 14 which places the new status information in status database 16. When status receiver 14 updates the status in status database 16, it sets a flag on the particular database record indicating a change in status.

Periodically, electronic mail messenger 15 checks status database 16, to see if the status of any record has changed, by examining the records' status flags. If a record has been flagged, then electronic mail messenger 15 composes an electronic mail message 12 based on the new status information in status database 16. This electronic mail message 12 is transmitted to the customer over the wide area network 275.

Figure 3:
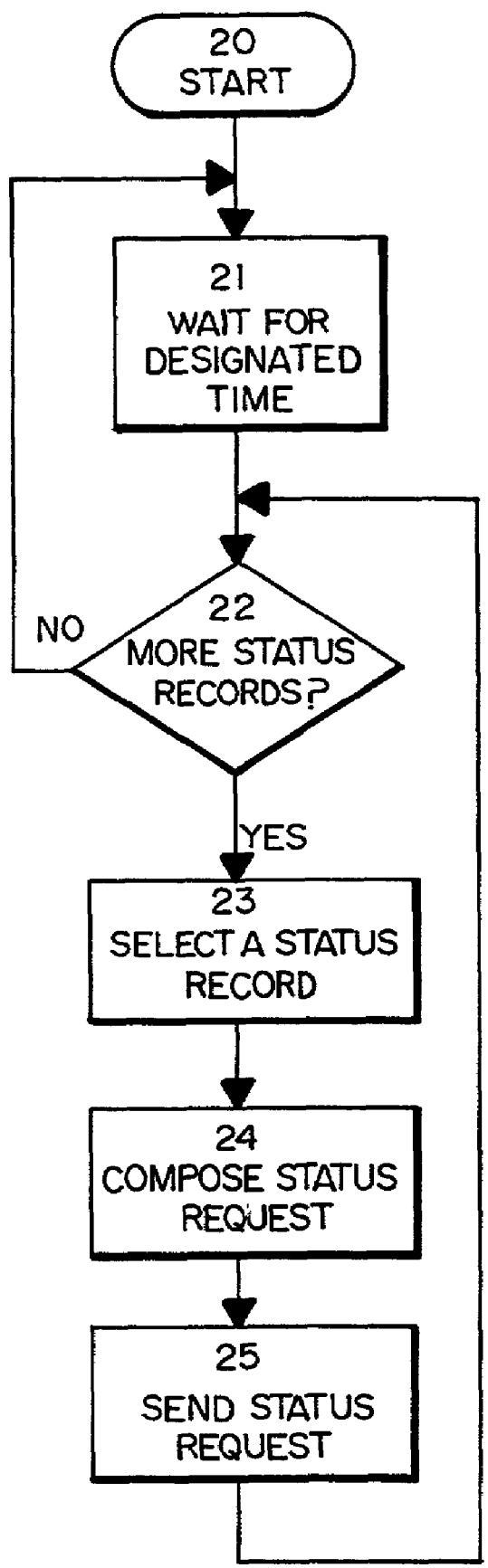
FIG. 3 is a flowchart illustrating the status requester and its method of operation.

FIG. 3 illustrates the operation of status requester 13. In a preferred embodiment, the status requester is continually running a program that periodically requests status updates from other host computers on wide area network 275. After waiting 21 for a designated time, which for a shipping status update is preferably every six to twenty-four hours, status database 16 is checked 22 to see if there are more status records. If so, then a status record is selected 23 and a status request is composed 24. This status request is sent 25 to another host computer on wide area network 275. This requesting process continues until each of the status records in status database 16 have been checked 22.

Figure 4:
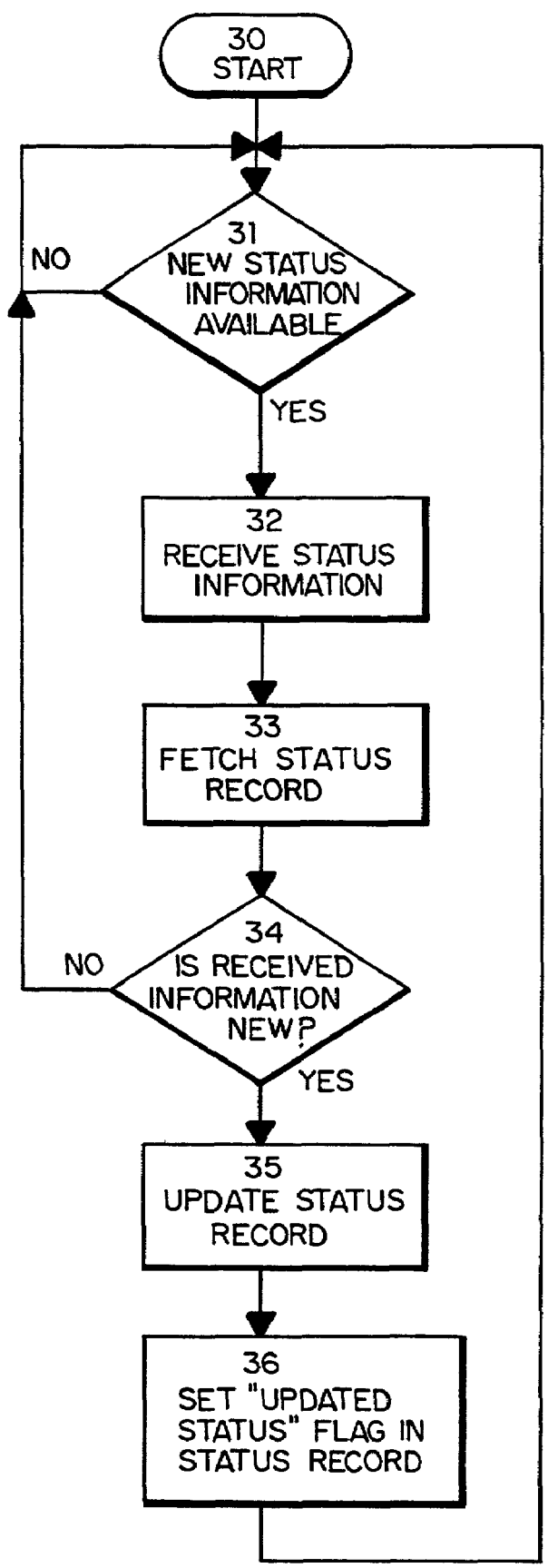
FIG. 4 is a flowchart illustrating the status receiver and its method of operation.

FIG. 4 illustrates the operation of status receiver 14. In the preferred embodiment, the status receiver is a continually running program that periodically receives status information 11 from another host computer on wide area network 275 based on requests generated by status requester 13. Wide area network 275 is continually checked for new status information 11. If new status information is found available at 31 then the status information is received 32 and the corresponding status record is fetched 33 from status database 16. The information is compared with that in the status record to determine 34 if the received information is new. If the received information is new, then the status record is updated 35 in status database 16 and the Updated Status flag is set 36 in the status record.

Figure 5:
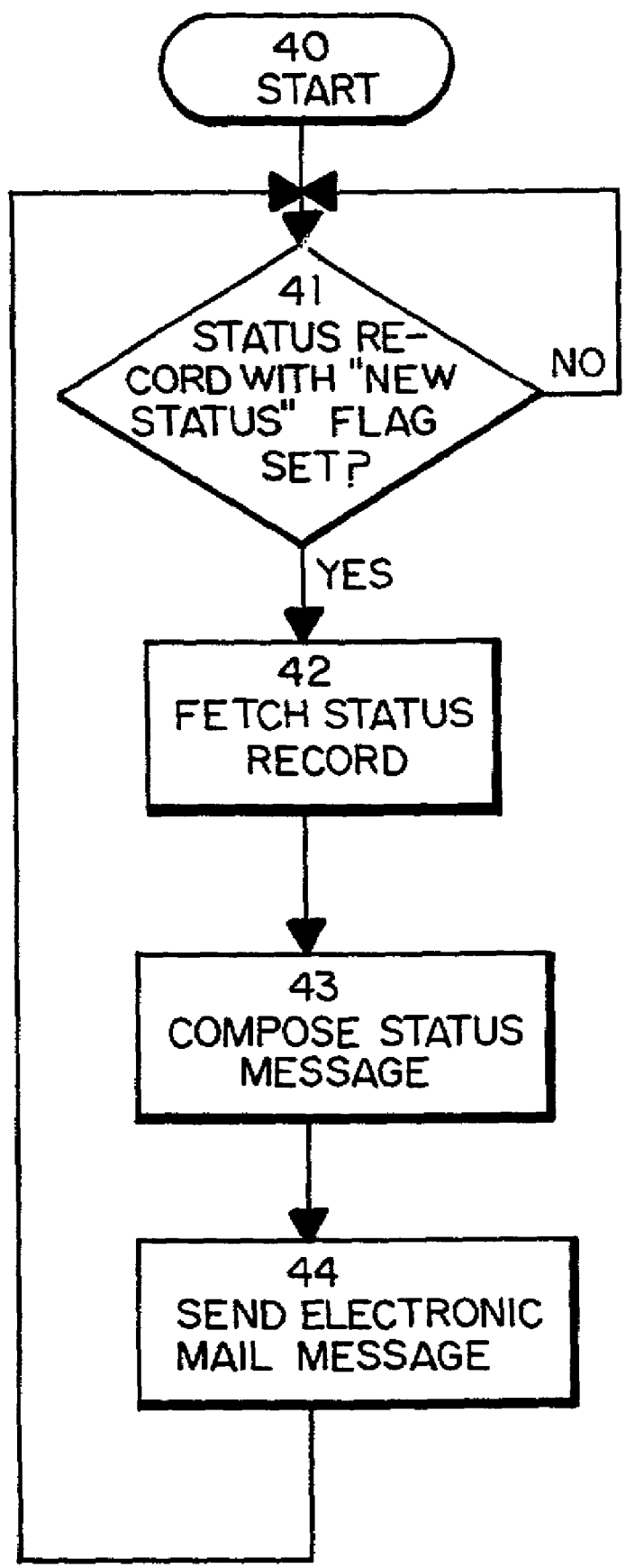
FIG. 5 is a flowchart illustrating the electronic mail messenger and its method or operation.

FIG. 5 illustrates the operation of electronic mail messenger 15. In a preferred embodiment, the electronic mail messenger is a continually running program that periodically checks 41 status database 16 to see if any records have an "Updated Status" flag set. If so, the appropriate status record is fetched 42 from status database 16 and an electronic mail message is composed 43 regarding the new status information. This electronic mail message is then preferably sent 44 to the recipient over wide area network 275.

One skilled in the art to which the present invention pertains will recognize that the various components of the system may communicate between themselves in a variety of ways. In a preferred embodiment, status receiver 14 signals electronic mail messenger 15, via an "Updated Status" flag in the appropriate database records, that a new update message should be sent. However, status receiver 14 could directly communicate with electronic mail messenger 15 to send a status update message without setting a signaling flag in status database 16 and awaiting discovery of such a flag by the electronic mail messenger.

One skilled in the art to which the present invention pertains will further recognize that components of status requester 13 and status receiver 14 may be combined into a single module that communicates with a remote host computer in a synchronous fashion. For example, the status requester portion of the combined module could send a status request to the remote host computer and wait for the status information to be received before proceeding to submit the next status request to the remote host computer. This type of synchronous operation is quite common in electronic data interchange applications.

The present invention is preferably implemented as a software program on a host computer such as 250 in FIG. 1 within a network 275 such as the Internet. The program may be loaded onto computer 250 from disk 248 or a similar storage medium A general description of the present invention as well as a preferred embodiment of the present invention has been set forth above. Those skilled in the art to which the present invention pertains will recognize and be able to practice additional variations to the methods and system described within the teachings of this invention. Accordingly, all such modifications and additions are deemed to be within the scope of the invention which is to be limited only by the appended claims.

What is claimed is:

1. An update processing and transmission system, comprising:
   status query means for automatically obtaining status information relating to a commerce-related event from a common carrier information system via a network, the common carrier information system generating the status information;
   storage means for storing the status information relating to the commerce-related event;
   status information retrieval means for automatically retrieving said status information from the common carrier information system via the network and updating the status information in the storage means;
   message generation means for automatically generating a status message reflective of said status information stored in the storage means; and
   message forwarding means for automatically forwarding said status message to a point where it may be accessed by an interested party.

2. The system of claim 1, wherein said status information relates to shipment of an item.

3. The system of claim 1, wherein said status information retrieved by said status information retrieval means is contained on a second computer physically remote from a first computer on which said status information is stored and accessible via the network.

4. The system of claim 1, wherein said status information is stored on a status information database within a first computer.

5. The system of claim 1, further comprising a status information database for separately storing status information.

6. An update processing and transmission method, including:
   automatically obtaining status information relating to a commerce-related event in response to a status query to a common carrier information system, wherein the status information is received from the common carrier information system over a network;
   storing the status information in a status database relating to the commerce-related event, the common carrier information system generating the status information;
   retrieving said status information from the status database;
   automatically generating a status message reflective of said status information; and
   automatically forwarding said status message to a point where it may be accessed by an interested party.

7. The method of claim 6, wherein said status information relates to shipment of an item.

8. The method of claim 6, wherein said status information retrieved is contained on a first computer physically remote from a second computer which stores the status information.

9. The method of claim 6, wherein said status information is stored on the status information database within a first computer.

10. The method of claim 6, further comprising separately storing said status information.

11. A computer-readable medium embodying instructions which, when executed by a computer, cause the computer to execute the method of claim 6.

* * * * *

UNITED STATES PATENT AND TRADEMARK OFFICE
CERTIFICATE OF CORRECTION

PATENT NO. : 7,139,726 B2
APPLICATION NO. : 09/426573
DATED : November 21, 2006
INVENTOR(S) : Fisher et al.

It is certified that error appears in the above-identified patent and that said Letters Patent is hereby corrected as shown below:

Title page 2, in field (56), under "Other Publications", in column 1, line 2, delete "Catalobs" and insert -- Catalogs --, therefor.

Title page 2, in field (56), under "Other Publications", in column 1, line 3, delete "Openingres" and insert -- OpenIngres --, therefor.

Title page 2, in field (56), under "Other Publications", in column 1, line 5, delete "11,1 995" and insert -- 11, 1995 --, therefor.

Title page 2, in field (56), under "Other Publications", in column 2, line 10, delete "Packge" and insert -- Package --, therefor.

Title page 2, in field (56), under "Other Publications", in column 2, line 15, delete "20/T996" and insert -- 20/1996--, therefor.

Title page 2, in field (56), under "Other Publications", in column 2, line 28, delete "Oberdorf" and insert -- Oberndorf --, therefor.

Title page 2, in field (56), under "Other Publications", in column 2, line 44, delete "enabled" and insert -- Enabled --, therefor.

Title page 2, in field (56), under "Other Publications", in column 2, line 47, delete "Issn" and insert -- ISSN --, therefor.

In column 4, line 58, after "medium" insert -- . --.

UNITED STATES PATENT AND TRADEMARK OFFICE
CERTIFICATE OF CORRECTION

PATENT NO. : 7,139,726 B2
APPLICATION NO. : 09/426573
DATED : November 21, 2006
INVENTOR(S) : Fisher et al.

It is certified that error appears in the above-identified patent and that said Letters Patent is hereby corrected as shown below:

In column 6, lines 30-31, in Claim 11, delete "which, when executed by a computer, cause the computer to execute the method of claim 6." and insert -- to be executed by a computer to execute an update processing and transmission method, said method comprising:
automatically obtaining status information relating to a commerce-related event in response to a status query to a common carrier information system, wherein the status information is received from the common carrier information system over a network;
storing the status information in a status database relating to the commerce-related event, the common carrier information system generating the status information;
retrieving said status information from the status database;
automatically generating a status message reflective of said status information; and
automatically forwarding said status message to a point where it may be accessed by an interested party. --, therefor.

Signed and Sealed this

Seventh Day of August, 2007

JON W. DUDAS
*Director of the United States Patent and Trademark Office*